May 3, 1955

H. V. HANCE 2,707,751

DELAY LINE PULSE STRETCHER

Filed March 12, 1946

Inventor
HAROLD V. HANCE

By M. O. Hayes

Attorney

United States Patent Office 2,707,751

Patented May 3, 1955

2,707,751

DELAY LINE PULSE STRETCHER

Harold V. Hance, Washington, D. C.

Application March 12, 1946, Serial No. 653,926

2 Claims. (Cl. 250—27)

(Granted under Title 35, U. S. Code (1952), sec. 266)

This invention relates to a system of electronic pulsing and more specifically to a means for stretching the duration of an electrical pulse.

It is the object of this invention to provide an electronic circuit for stretching the duration of an electrical pulse without causing distortion of the pulse in other respects.

It is another object of this invention to provide an electronic circuit for stretching the duration of an electrical pulse to three times its original value without causing amplitude distortion.

It is a further object of this invention to provide an electronic circuit for stretching the duration of an electrical pulse to at least twice its original value without causing amplitude distortion.

Figure 1:
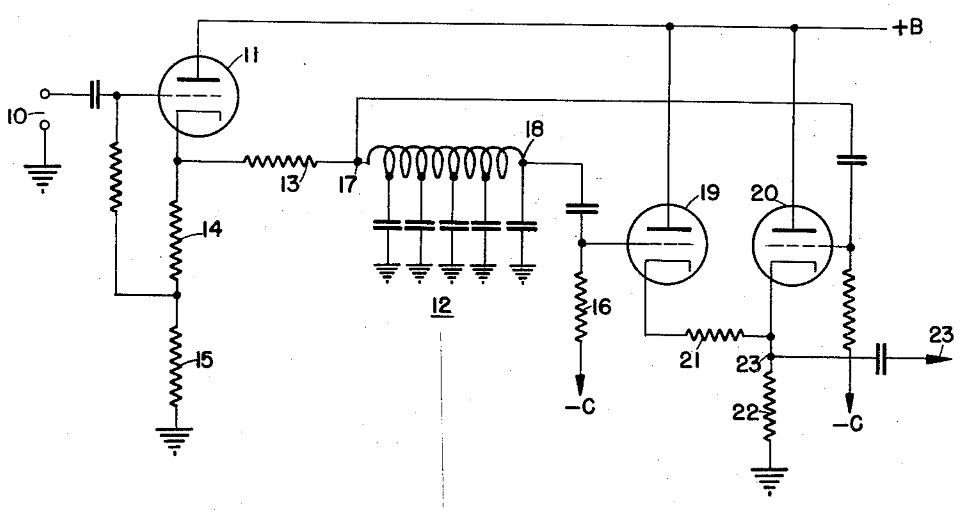
Figure 2:
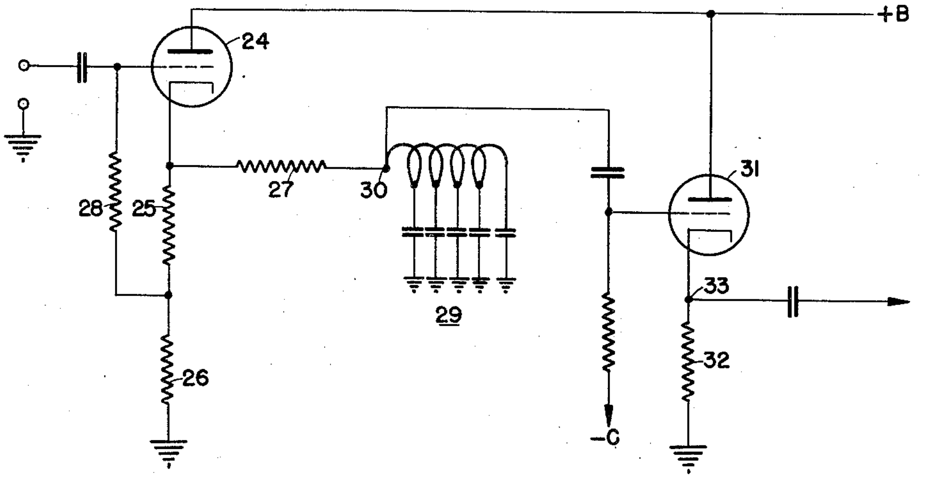

Other objects and advantages of the invention will be apparent from the following detailed description when taken in conjunction with the accompanying drawings which illustrate preferred embodiments of the invention, and in which:

Fig. 1 is a detailed circuit diagram of one embodiment of the invention, and Fig. 2 is a detailed circuit diagram of an alternate embodiment of the invention.

Broadly, the increase in pulse duration is effected by utilizing reflection and delay properties of an artificial transmission line. For example, in the case where the pulse duration is to be tripled, a delay line equipped with a one-way delay equal to the pulse duration may be employed. Then, if the expanded pulse be considered as divided into three equal portions, the first portion can be obtained from the input pulse itself; the middle portion from the output of the delay line, as a result of a delay of one pulse length which occurs from the input pulse traveling through the delay line; and the final portion from the reflected image of the input pulse as it appears at the input to the delay line.

To obtain a pulse whcih will be approximately twice as long as the original pulse, it is proposed that a delay line having a one-way delay of one-half of a pulse length be used. Thus, a total delay of one pulse length will result from an input pulse traveling to the end of the delay line and then being reflected back to the input of the delay line.

In Fig. 1, to which reference is now had, a circuit is shown for stretching the duration of a pulse three times its original value. This embodiment comprises an input tube 11, an artificial transmission line 12 whose one way delay is equal to the input pulse duration, and a pulse combining circuit comprising tubes 19 and 20. The input pulse, or pulse to be stretched, is introduced at the input terminals 10 and is coupled through tube 11 to the input terminal 17 of line 12. Since it is usually desirable to effect a minimum of loading on a pulse source applied at the input terminals 10 the impedance seen looking in these terminals should be high. For this reason tube 11 is connected as a cathode follower by means of cathode resistances 14 and 15. The line 12 is connected thereto by way of resistance 13. To obtain a unity power coupling between tube 11 and line 12 the impedance seen looking away from the input terminal 17 of the line should match the line impedance. To this end resistance 13 is selected, so that the series combination of the resistance and the output impedance of tube 11, which is essentially the reciprocal of the tube transconductance, will match the line impedance. In order not to disturb this match of impedances, the values of the cathode resistances 14 and 15 are so chosen that their sum value will greatly exceed the input impedance of the line.

The pulse combining circuit, comprising tubes 19 and 20, is connected to line 12 so that the grid of tube 20 is connected to the input terminal 17 thereof and the grid of tube 19 is connected to the output terminal 18 thereof. For reasons hereinafter to become obvious, the terminating impedance of line 12, essentially the grid return resistance 16 of tube 19, is made higher than the line impedance. The cathodes of tubes 19 and 20 are connected together via voltage dividing resistance 21 and common cathode resistance 22. Across the latter resistance the output terminals 23 for the circuit are taken. As thus arranged, an input pulse applied at terminals 10 will be applied simultaneously to the input of the line 12 and the grid of tube 20. Then if the line 12 is selected so that the time required for a wave to propagate from the input terminal 17 to the output terminal 18 is equal to the input pulse duration the leading edge of the delayed incident pulse will reach the grid of tube 19 at the instant the trailing edge of the input pulse appears at the grid of tube 20. Since the terminating impedance (resistance 16) of the line 12 is much greater than the line impedance, the incident pulse will be reflected without inversion or loss of amplitude back to the input terminal 17 of the line. Consequently at the instant the trailing edge of the delayed incident pulse appears at the grid of tube 19 the leading edge of the reflected pulse appearing at terminal 17 will be impressed on the grid of tube 20. Therefore, by combining the input pulse at terminal 10 with the delayed incident and reflected pulse, a pulse of three times its original duration can be produced at the terminal 23. Because of the high grid-cathode impedance of the triode 19, the delay line appears, for all practical purpose, to be working into an open-circuit output impedance.

According to network theory, the amplitude of the delayed incident pulse voltage at the terminal 18 is twice the amplitude of the pulses at the terminal 17. Accordingly, the resistance 21, having a value equal to the inverse of the transconductance of the tube 19, is connected between the cathodes of the tubes 19 and 20, to cut in half the amplitude of the pulse voltage from the terminal 18. The above value of the resistance 21 is predicated on the assumption that tubes 19 and 20 will have substantially equal transconductances. The resistance 22 serves as the common cathode resistance for the two cathode-followers whose tube elements are the tubes 19 and 20, respectively, and the output pulses are mixed across this resistance. The resistance 22 has a much greater value than the inverse of the transconductance of either the tube 19 or 20 so that most of the pulse voltage introduced at the grids of the triodes 19 and 20 is developed across this resistance. In order that spurious wiggles may be kept at a minimum in the expanded pulse, the input pulse should be fairly square in shape. Alternately, pulses with sloping edges may be employed and the circuit parameters, namely the delay of line 12, adjusted so that the pulses overlap slightly in time.

Fig. 2 shows the circuit for a pulse length multiplier which will double the length of the input pulse. The input pulse is introduced at the grid of the triode 24 constituting the tube element of a cathode-follower circuit which includes the cathode resistances 25 and 26. As in Figure 1, the values of resistances 25 and 26 are so chosen that their sum is very much greater than the inverse of the transconductance of the tube 24 added to the value of the resistance 27. The cathode-follower circuit also serves in a similar capacity as the corresponding cathode-follower stage in Figure 1, functioning as a means of reducing the impedance of the pulse before the pulse is fed to the delay line 29. Thus the inverse of the transconductance of the tube 24 added to the value of the resistance 27, which is connected between the cathode of the tube 24 and the input terminal 30 of the delay line 29, should equal the input impedance of the delay line. The one-way delay of the line 29 is equal to one half of the pulse length so that a total delay of one pulse length results at the input terminal 30 from the input pulse traveling the length of the line and being reflected back through the line. Both the input pulse and the reflected pulse are introduced from the terminal 30 to the grid of a triode 31. The tube 31 and the resistance 32 comprise the elements of a cathode-follower stage, and the pulse output is developed across the resistance 32 and taken from the terminal 33. It should also be recognized that an input pulse may be multiplied in length to six times its original length by combining the circuits shown in Figures 1 and 2. Thus a multiplication in length of six times the original length may be effected by using two delay lines whose total one-way delay is 2½ times the input pulse length.

While certain preferred embodiments of this invention have been described, it is realized that many modifications and variations of this invention may be made and no limitations upon this invention are intended other than may be imposed by the scope of the appended claims.

The invention described herein may be manufactured and used by or for the Government of the United States of America for governmental purposes without the payment of any royalties thereon or therefor.

What is claimed is:

1. An apparatus for stretching a fixed duration input pulse comprising, an input channel adapted to receive said input pulse, an artificial transmission line having both input and output terminals, said transmission line being operable to delay the input pulse by an amount equal to a function of said fixed duration, impedance matching means connecting said input channel to the input terminals of said artificial transmission line, multiple cathode follower output channels, each of said cathode followers including an electron tube having a cathode, a plate and at least one grid, a common cathode impedance connected to said cathodes across which the output pulse of stretched duration may be taken, high impedance pulse reflecting means connecting a grid of one of said cathode followers to the output terminals of said transmission line for recovering said delayed pulse, and means connecting the input of said artificial line to a grid of another of said cathode followers for recovering the input pulse and its reflected image.

2. An apparatus for stretching a fixed duration input pulse comprising, an input channel adapted to receive said input pulse, an artificial transmission line having both input and output terminals, said transmission line being operable to delay the input pulse by an amount equal to a function of said fixed duration, impedance matching means connecting said input channel to the input terminals of said artificial transmission line, multiple cathode follower output channels, each of said cathode followers including an electron tube having a cathode, a plate and at least one grid, a common cathode impedance connected to said cathodes across which the output pulse of stretched duration may be taken, high impedance pulse reflecting means connecting a grid of one of said cathode followers to the output terminals of said transmission line for recovering said delayed pulse, said cathode follower having an additional cathode impedance in series with said common cathode impedance, and means connecting the input of said artificial line to a grid of another of said cathode followers for recovering the input pulse and its reflected image.

References Cited in the file of this patent

UNITED STATES PATENTS

| | | |
|---|---|---|
| 2,200,009 | Nuttall | May 7, 1940 |
| 2,266,154 | Blumlein | Dec. 16, 1941 |
| 2,266,401 | Reeves | Dec. 16, 1941 |
| 2,303,968 | White | Dec. 1, 1942 |
| 2,401,416 | Eaton et al. | June 4, 1946 |
| 2,433,379 | Levy et al. | Dec. 30, 1947 |
| 2,457,559 | Huber | Dec. 28, 1948 |
| 2,617,883 | Anger | Nov. 11, 1952 |